United States Patent [19]

McArdle et al.

[11] Patent Number: 5,141,970
[45] Date of Patent: Aug. 25, 1992

[54] METHOD OF FORMING HIGH-TEMPERATURE RESISTANT POLYMERS

[75] Inventors: Ciaran B. McArdle; Joseph Burke, both of Dublin, Ireland; John G. Woods, Farmington; Edward K. Welch, II, Bristol, both of Conn.

[73] Assignee: Loctite (Ireland) Limited, Dublin, Ireland

[21] Appl. No.: 625,574

[22] Filed: Dec. 10, 1990

[51] Int. Cl.$^5$ .............................................. C08F 2/46
[52] U.S. Cl. .................................... 522/170; 522/181; 427/44; 427/54.1; 526/313; 568/654; 568/657
[58] Field of Search ................ 522/170, 181; 526/313; 568/654, 657; 427/44, 54.1

[56] References Cited

U.S. PATENT DOCUMENTS

| | | |
|---|---|---|
| 4,116,936 | 9/1978 | Steiner ................... 526/286 |
| 4,128,600 | 12/1978 | Skinner et al. .......... 522/12 |
| 4,352,723 | 10/1982 | Morgan ................... 522/21 |
| 4,425,207 | 1/1984 | Boeckeler et al. ..... 522/43 |
| 4,543,397 | 9/1985 | Woods et al. ........... 526/313 |
| 4,640,937 | 2/1987 | Hanyuda ................. 522/31 |
| 4,732,956 | 3/1988 | Woods et al. ........... 526/260 |

FOREIGN PATENT DOCUMENTS 971754 10/1964 United Kingdom .

OTHER PUBLICATIONS

Chem-Abstract, vol. 109, No. 18, Oct. 1988 Abstract No. 150680e.
Hardwood, L. M.; "Trifluoroacetic Acid Catalysed Claisen Rearrangement of 5-Allyloxy-2-hydroxybenzoic Acid and Esters: an Efficient Synthesis of (±)-Mellein," J. Chem. Soc., Chem. Commun., pp. 1120–1122; 1982.

Primary Examiner—Marion E. McCamish
Assistant Examiner—Mark A. Chapman
Attorney, Agent, or Firm—Edward K. Welch, II.; Eugene F. Miller

[57] ABSTRACT

A method of forming high-temperature resistant polymers by a 2 step curing process comprising
(a) curing a polymerizable composition at least one aromatic compound having alpha and/or beta instruction which is not substantially reactive under the curing condition of step a, particularly allyl or properyl, and
(b) heating the cured composition of step a in the presence of acid to form a crosslinked resin.

23 Claims, No Drawings

METHOD OF FORMING HIGH-TEMPERATURE RESISTANT POLYMERS

CROSS REFERENCE TO RELATED APPLICATIONS

This Application is related to application Ser. No. 07/625,725 filed on even date herewith now U.S. Pat. No. 5,084,490 entitled "Styryloxy Compounds and Polymers thereof" (McArdle, et al) the contents of which are incorporated herein by reference.

BACKGROUND OF THE INVENTION

This invention relates to a method of forming high-temperature resistance polymers by a 2-stage curing process, particularly for use in the field of adhesives, sealants, thread-locking compositions, gaskets and the like.

U.S. Pat. No. 4,543,397 Woods et al, describes polyfunctional cationically polymerizable styryloxy compounds of the formula I or II

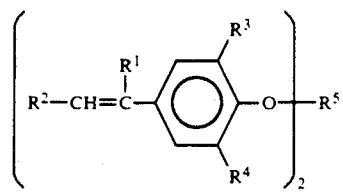

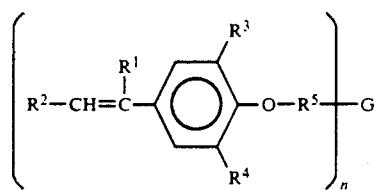

where $R^1$ and $R^2$ are H, or one of $R^1$ and $R^2$ is H and the other is methyl; $R^3$ and $R^4$ are H, lower alkyl or alkoxy if $R^2$ is not methyl; $R^5$ is a divalent hydrocarbon radical; G is a multivalent organic or inorganic radical free of amine, aliphatic hydroxyl, aliphatic thiol or other groups which interfere with cationic polymerisation; and n is an integer of two or more.

The polyfunctional telechelic styryloxy monomers of the kind described in U.S. Pat. No. 4,543397 are generally of high molecular weight. Even so, example 10 of that Patent describes the preparation of 4-allyloxystyrene of the formula III

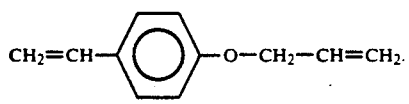

This compound is cationically active but it forms linear polymers which are purple/blue in colour and only 10% insoluble in organic solvents i.e. little if any crosslinking has occurred. That which may occur likely results from radical initiation of the allyl group since radicals may also be produced from the photocationic initiator.

Our U.S. patent application Ser. No. 07/625,725 now U.S. Pat. No. 5,084,490 entitled "Styryloxy Compounds and Polymers Thereof" of even date herewith describes styryloxy compounds of the formula IV

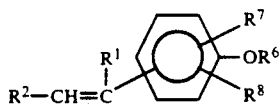

wherein $R^1$ and $R^2$ are H, or one of $R^1$ and $R^2$ is H and the other is methyl; $R^7$ and $R^8$ (which may be the same or different) are H, $C_1$-$C_5$ alkyl or $C_1$-$C_5$ alkenyl; or one of $R^7$ and $R^8$ may be —$OR^6$ or $C_1$-$C_5$ alkoxy or $C_1$-$C_5$ alkenyloxy if $R^2$ is not methyl; and $R^6$ is selected from the group consisting of:

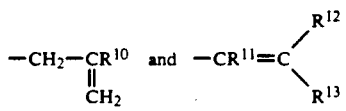

where $R^{10}$ is $C_1$-$C_5$ alkyl; and $R^{11}$, $R^{12}$ and $R^{13}$, which may be the same or different, are H or $C_1$-$C_5$ alkyl.

The most preferred compounds are of the formula V

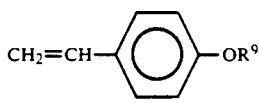

wherein $R^9$ is selected from the group consisting of:

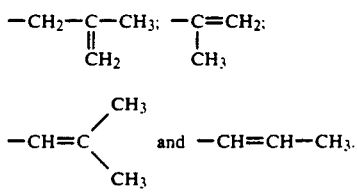

The compounds of said Patent Application are monofunctional with respect to the styryl group but are difunctional because of the other cationically active substituent —$OR^6$ or —$OR^9$. They are compatible with photoinitiators and can be photocured to give highly transparent polymeric films with good mechanical properties after short irradiation times e.g. 10 seconds or less. The Patent Application also describes mixed styryloxy compositions comprising a compound of the formula IV and allyloxystyrene.

SUMMARY OF THE INVENTION

The present invention provides a method of forming high-temperature resistant polymers which comprises a 2-stage curing process comprising:

(a) curing a polymerisable composition (A) containing at least one compound of the formula VI:

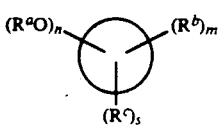

wherein ◯ is a single or multiple aromatic ring structure, each $R^1$, which may be the same or different, is H or alkenyl, which may optionally substituted;

each $R^b$, which may be the same or different, is alkenyl, which may optionally be substituted;

each $R^c$, which may be the same or different, is a polymerisable or non-polymerisable group which does not interfere with the polymerisation of the composition;

$n = 1$;

$m = 0-3$;

$(m+n) \leq 6$; and $0 \leq s \leq r-(m+n)$ where r is the total number of substitutable positions on the ring structure:

provided that (I) when the polymerisable composition A comprises a compound of formula VI and a matrix monomer, said matrix monomer being curable or polymerisable under the curing conditions of step (a), then (i) at least two of the moieties $R^a$ and/or $R^b$ must have unsaturation at the alpha or beta carbon atom or (ii) at least one of the moieties $R^a$, $R^b$, or $R^c$ is polymerisable or curable under the curing conditions of step (a) and at least one other of $R^a$ or $R^b$ has unsaturation at the alpha or beta carbon atoms: and (II) when the polymerisable composition A comprises a mixture of compounds of formula VI then (i) at least one of said compounds has at least one moiety $R^a$, $R^b$ or $R^c$ which is polymerisable or curable under the curing conditions of step (a) and least one moiety $R^a$ or $R^b$ which has unsaturation at the alpha or beta carbon atom and (ii) the other compound has the same requirements as I (i) or II (i) above; and (III) when the polymerisable composition A contains as the only polymerisable component, a compound of formula VI, then said compound has at least one moiety $R^1$, $R^b$ and/or $R^c$ which is polymerisable or curable under the curing conditions of step (a) and at least one moiety $R^a$ or $R^b$ which has unsaturation at the alpha beta carbon atom; and provided that the curing conditions for step (a) are not such as would cause the substantial polymerisation of the moieties $R^a$ and $R^b$ having or alpha or beta unsaturation, and provided that when $m = 0$ or when the required number of moieties $R^a$ and $R^b$ having alpha or beta unsaturation is greater than the number of $R^b$ moieties having said alpha or beta unsaturation, then at least one substitutable position ortho to each $-OR^a$ ($R^a$ not equal to H) or the para position thereto, or in the case of a fused ring structure at least one position on the fused ring, is unsubstituted;

the alpha carbon atom being that carbon atom nearest the oxygen atom (in the case of $R^a$) or the ring (in the case of $R^b$);

and (b) subsequently heating the cured composition in the presence of acid to form a high temperature resistant crosslinked resin.

The ring structure O may suitably be selected from phenyl, fused aromatic ring structures and

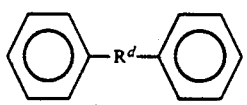

VII wherein $R^d$ represents a covalent bond, a substituted or unsubstituted alkylene group,

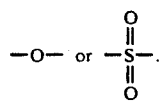

Preferably the ring structure is phenyl or a bridged biphenyl ring structure as shown in formula VII, most preferably phenyl.

Preferably $R^a$ and/or $R^b$ is straight or branched chain alkenyl moiety, optionally substituted with halo or interrupted with $-O-$ or $-S-$. More particularly, $R^a$ and/or $R^b$ is alkenyl having 2-10 carbon atoms, especially 3-5 carbon atoms. However, when $R^a$ is H, at least one of the positions ortho or para, preferably ortho, to $-OR^a$ is substituted with $R^b$ having alpha or beta unsaturation.

More particularly, $R^a$ and/or $R^b$ is selected from the group consisting of

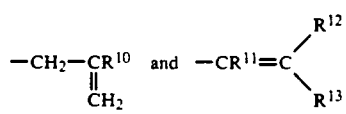

wherein $R^{10}$, $R^{11}$, $R^{12}$ and $R^{13}$, which may be the same or different, are H or $C_1$-$C_5$ alkyl; provided that at least one of $R^{11}$, $R^{12}$ or $R^{13}$ is other than H.

$R^c$ may be a polymerisable moiety which is polymerisable or curable under the curing or polymerisation condition of step (a). Said moiety may be reactive with other or like moieties $R^c$ or with either or both of moieties $R^a$ and/or $R^b$. With respect to the latter, such reactivity should only be to a minor extent under the curing conditions of step (a). Alternatively, said moieties $R^c$ may be co-reactive with any reactive moieties of the matrix monomer if present.

Preferably $R^c$ is a polymerisable group selected from

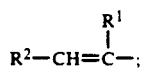

wherein $R^1$ and $R^2$ are H, or one of $R^1$ and $R^2$ is H and the other is methyl;

a vinyl ether group;

an acrylic group; or an epoxy group.

Alternatively $R^c$ may be a non-polymerisable group, such as a substituted or unsubstituted alkyl group, free of amino, aliphatic hydroxyl or aliphatic thiol substitution.

In the preferred embodiment, the polymerisable composition contains at least one compound of the formula IV above. Especially preferred compounds are those of the formula VIII as follows:

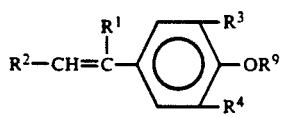

VIII wherein $R^1$ and $R^2$ are as defined above; $R^3$ and $R^4$ are H, lower alkyl or, if $R^2$ is not methyl, alkoxy; provided that at least one of $R^3$ or $R^4$ is H, and $R^9$ is selected from the group consisting of

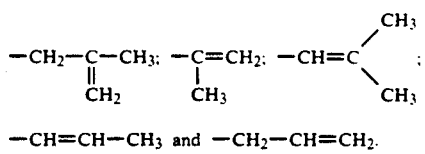

$-CH=CH-CH_3$ and $-CH_2-CH=CH_2$.

A preferred class of compositions useful in the practice of the present invention is that wherein the first stage of the curing process is by photocuring, said compositions additionally containing a photoinitiator. The second stage is then carried out at elevated temperatures in the presence of acid generated by the photoinitiator. However, in accordance with the teachings and practice of the present invention, the first stage may alternatively be carried out by other curing processes e.g. heat, redox, anionic, atmospheric, e-beam, X-ray, gamma-ray. The acid necessary for effecting the second stage of the curing process may be generated or released thermally or photochemically or by other means. Alternatively, the acid may be initially present in the composition, optionally sealed in microcapsules which are subsequently ruptured for the second stage.

The conditions of temperature and time for the heat treatment in the second stage of the curing process will be readily apparent to those skilled in the art and will not necessitate undue experimentation. Generally, typical conditions for the formation of heat-resistant cross-linked resins may be employed. Preferably, temperatures above about 125° C., most preferably of about 140°-150° C., will be required. The time period for the heat treatment will also vary and will generally be at least about one half hour or more, preferably about one hour or more (for temperatures of about 150° C.). It is also recognised that treatments at a lower temperature for a longer period of time or at a higher temperature for a shorter period of time may also suffice and such parameters are within the scope of the process of the present invention.

Although the precise mechanism or mechanisms by which cross-linked resins are obtained in accordance with the process of the present invention is not known, it is believed that such resins form by way of a phenolic resin type crosslinking during the second stage of the curing process. This crosslinking is believed to take place, predominately, if not exclusively, through the alpha and/or beta unsaturation of the $R^a$ and $R^b$ moieties. Furthermore, where the required alpha or beta unsaturation is present in the $R^a$ moiety, then it is believed that a Claisen type rearrangement occurs whereby the oxygen-carbon bond in the $-OR^a$ moiety is broken and the $R^a$ radical rearranges to an ortho or para position, or a substitutable position on the other ring in the instance of fused ring structures, preferably the ortho position, and is replaced, on the oxygen, by H. This rearranged structure is then ammenable to the phenolic type crosslinking mechanism. Ultimately, then, the crosslink density of the final cured material will depend upon the extent to which compounds of formula VI are present in the polymerisable composition and on the number of moieties $R^a$ and $R^b$ which have alpha or beta unsaturation and, in the case of structures having the $R^a$ moiety, the extent to which the Claisen type rearrangement occurs.

As mentioned above, when $R^a$ in the starting material of formula VI has alpha or beta unsaturation and a position ortho or para to $-OR^a$ is unsubstituted (i.e., H) then it is believed that a Claisen type rearrangement occurs. Such rearrangement may occur to a small extent during the first stage and to a greater extent during the second stage. The resultant structure is that of a substituted phenol preferably having the alkenyl group attached at a position ortho to the unprotected hydroxyl group. This mechanism is illustrated for a simple compound of formula VIII wherein $R^1$, $R^2$, $R^3$ and $R^4$ are all H and $R^a$ is $CH_2=CH-CH_2-$ in the following diagram:

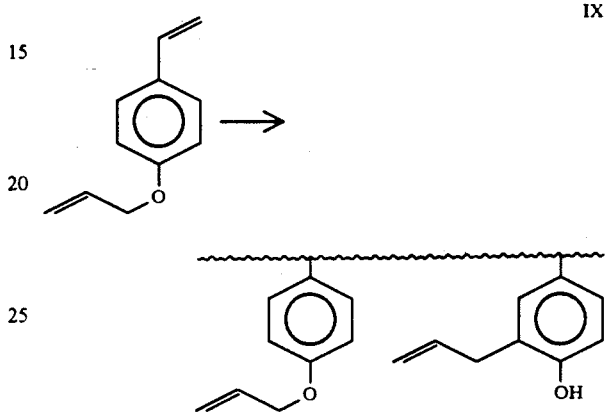

It is believed that the structure on the right of diagram X is susceptible to electrophilic substitution at the 6-position on the ring (ortho to the $-OH$ group) and can react by forming strong carbon-to-carbon crosslinking bonds of the phenolic resin type, particularly with the electrophilic allyl group on similar molecules.

While a Claisen rearrangement of this kind is known to occur in the liquid state, the present inventors are not aware of such a rearrangement being obtained heretofore in the solid state. Furthermore, while applicants have set forth their belief as to the mechanism(s) involved in the process of the present invention, applicants do not desire nor should they be construed as being bound by the same. Rather, the foregoing discussion has been added to help in the understanding of what may be occurring.

In accordance with the practice of the present invention, compounds of formula VI may be polymerised alone, in combination with other compounds of formula VI and/or in combination with other polymerisable monomers, e.g., matrix monomers. These variants of the present invention are discussed below.

In instances wherein the polymerisable composition comprises only one compound of formula VI, it is preferred to use 4-propenyloxystyrene and other like compounds which have the crosslinking characteristics of a beta-vinyl ether, especially 4-propenyloxystyrene. Alternatively, the polymerisable composition may also comprise a mixture of styryloxy monomers of formula VI, especially those wherein at least one of the monomers is 4-propenyloxystyrene or a like compound having the crosslinking characteristics of a beta-vinyl ether. Exemplary of such a suitable mixture is 4-propenyloxystyrene and 4-allyloxystyrene. Generally, any ratio of styryloxy monomers may be employed depending upon the desired characteristics of cured product after each stage of the curing method of the present invention. Where only one of said monomers has the crosslinking characteristics of a beta-vinyl ether, preferably 4-propenyloxystyrene, then said monomer will generally comprise from about 20 to 95 %, preferably from 40 to 90 %, by weight of the mixture.

Other suitable compounds of formula VI which are useful in the practice of the present invention include those having two or three alkenyloxy groups on the ring, preferably with one alkenyloxy group in the metal position relation to another e.g. a compound of the formula X

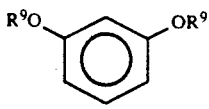

wherein $R^9$ is as defined above. A preferred compound is the dipropenyl derivative of resorcinol i.e. 1,3-dipropenyloxy benzene.

Another special feature of the present invention is the ability to use the compound(s) of formula VI together with other polymerisable monomers. Depending upon the polymerisation characteristics of both the specific compound of formula VI and the other monomer to be employed, said monomers may, during the first stage, copolymerise or concurrently polymerise or only one may polymerise in the first stage, with complete curing of all monomers in the second stage. The more common instance of the latter is where the compound of formula VI is non-polymerised under the curing conditions of the first stage and, thus, the other monomer comprises a matrix monomer. For the sake of brevity and convenience, the other monomer, regardless of whether it is or is not a true matrix monomer, as that term is understood by those skilled in the art, shall hereinafter be referred to as the matrix monomer.

Generally, any polymerisable monomer may be employed as a matrix monomer so long as it does not interfere with the polymerisation or curing of the overall composition, especially the polymerisation or curing of the compound of formula VI. Obviously, the choice of suitable matrix monomers will depend upon the cure modality of the first step as well as the specific structure of the compound of formula VI. Suitable matrix monomers will be readily recognised by those skilled in the art. A few of such matrix monomers are discussed in the context of the present invention below.

It is also contemplated, depending upon the constituents of the polymerisable composition, that the first stage of the curing process may also entail a minor, in comparison to the second stage polymerisation, degree of crosslinking: such first stage crosslinking providing strength and integrity to the cured product of the first stage. However, under the curing conditions (elevated temperatures) of the second stage, this crosslinking, if present, is believed to be broken, though the final product is more densely crosslinked during the second stage of the curing process through the alpha or beta unsaturation of the $R^a$ and $R^b$ moieties of the compound(s) of formula VI.

The proportions by which the compound(s) of formula VI and the matrix monomer are present within the mixture may be varied within wide limits, provided that a sufficient amount of the compound of formula VI is present to achieve the desired crosslinking in the second stage. Generally, the molar ratio of the compound of formula VI to the matrix monomer is from about 1:9 to 20:1, preferably from 2:1 to 9:1. As previously mentioned, the true make-up of the polymerisable composition will depend upon the desired characteristics of the cured product. Like the styryloxy monomers, the matrix monomer may be polymerisable by most any cure modality, e.g. cationic (including photocationic), heat, redox, anionic, atmospheric, electron beam, X-ray, gamma-ray or other suitable curing system. In each case, appropriate initiators, accelerators and other conventional adjuvants are included in the composition, in conventional amounts, as will be readily recognised by those knowledgeable in the art.

A preferred mode of cure in the first stage is cationic cure, especially photocationic curing. Thus, although matrix monomers of other cure modalities may be employed, it is especially preferred that the matrix monomer be cationically polymerisable. Exemplary of such suitable cationically polymerisable matrix monomers are the photopolymerisable vinyl ether monomers, especially the divinyl ethers of polyalkylene oxides, e.g. those of the formula $CH_2=CH-O-[-(CH_2)_n-O-]_m-CH=CH_2$ wherein $n=1-6$ (preferably $n=2$) and m is greater than or equal to 2 (preferably m 2-10). A preferred compound is the divinyl ether of triethylene oxide, which is commercially available.

Thus, such a first stage photocurable, second stage thermally crosslinkable composition may comprise:
(A) one or more compounds of the formula VI as defined above,
(B) a divinyl either of a polyalkylene oxide, and
(C) a photoinitiator.

Other suitable matrix monomers include the telechelic styryloxy monomers as described in U.S. Pat. No. 4,543,397, Woods et. al., especially the styryloxy capped polyether.

It is also contemplated within the scope of the present invention that the compound of formula VI be produced in situ in the composition during the first stage of the curing, especially during photocuring, by cleavage beyond a phenolic oxygen and/or by rearrangement. For example, a cationically polymerisable divinyl ether as described in pending U.S. patent application Ser. No. 07/543,248 of Klemarczyk et al filed Jun. 25, 1990 entitled "Aromatic Vinyl Ether Compounds and Compositions, and Method of Making the Same" assigned to Loctite Corporation, having the formula XI;

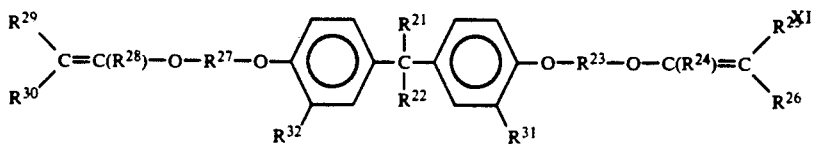

wherein $R^{21}$, $R^{22}$, $R^{24}$, $R^{25}$, $R^{26}$, $R^{28}$, $R^{29}$ and $R^{30}$ are each independently selected from hydrogen, halogen and $C_1$-$C_8$ alkyl radicals; $R^{23}$ and $R^{27}$ are each independently selected from $C_1$-$C_8$ alkylene radicals; and $R^{31}$ and $R^{32}$ are each independently selected from allyl and methallyl, on photocuring undergoes a small extent of cleavage beyond the phenolic oxygen atoms to form a compound of the formula XII:

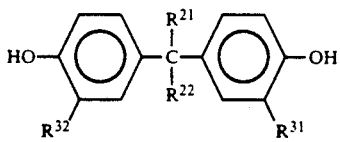

XII

This ortho-alkenyl compound then acts as the compound of formula VI. The remainder of the uncleaved divinyl ether may act as a matrix monomer in the 2-stage curing process, or another matrix monomer may be added.

As previously mentioned, the acid required for the second stage of the curing process may be generated in situ or may be added to the polymerisable composition. In either instance, the acid or acid precursor, in the case of in-situ generated acid, will be present in conventional amounts, as is well known to those skilled in the art. It is especially preferred that the acid be generated in-situ so as to avoid or minimize any potential for adverse effects on the composition caused by the presence of free acid, e.g., instability of the composition. Such a result may occur where the encapsulant for the acid fails, in the case of microencapsulated acid, prematurely. Consequently, the process of the present invention is thus especially suited for photopolymerisable compositions whereby the acid may be generated by the photoinitiator.

Generally, the photoinitiator may be any suitable UV cationic initiator. Such UV cationic photoinitiators include salts of complex halogenides having the formula:

where A is a cation selected from the group consisting of iodonium, sulfonium, pyrylium, thiopyrylium and diazonium cations, M isametalloid, and X is a halogen radical, b equals e minus f, f equals the valence of M and is an integer equal to from 2 to 7 inclusive, e is greater than f and is an integer having a value up to 8. Examples include di-p-tolyl iodonium hexaflourophosphate, diphenyl iodonium hexafluorophosphate, diphenyl iodonium hexafluoroarsenate and UVE (or GE) 1014 (trademark of General Electric), a commercially available sulfonium salt of a complex halogenide.

The invention may be illustrated by reference to the following non-limiting examples. It should be noted that applicants' use of the term "A stage" or "stage A" refers to the first step of the polymerisation process of the present invention. Similarly, applicants' use of the term "B stage" or "stage B" refers to the second step (i.e., heat and acid treatment) of thepolymerisation process of the present invention.

EXAMPLE 1

4-propenyloxy styrene was prepared by base-catalysed isomerisation of 4-allyloxystyrene using methanolic KOH (6 hours, 150° C.) as described in our co-pending Application of even date herewith entitled "Styryloxy Compounds and Polymers Thereof".

4-propenyloxystyrene formulated with 15 μl/gm of the commercially available latent acid photoinitiator GE 1014 from General Electric Co. formed a composition capable of undergoing dual cure to give a highly thermally resistant, crosslinked polymer. The A Stage involved a cationically photoinitiated polymerisation with 100 mW/cm$^2$ of UV light for 5-10 seconds. This stage also formed small amounts of photogenerated phenolic residues which have aromatic C-2 (ortho) alkenyl substitution, as evidenced by the formation and splitting of characteristic —OH bands in the 3500 cm$^{-1}$ region of the infra red spectrum where the higher energy band corresponds to free —OH and the lower energy band corresponds to an intramolecular hydrogen bonded - pi complex, as is already known for simple ortho-alkenyl phenols (Kalc, J. et al., J. Phys. Chem., 71 (12), 4045 (1967) and Baker, A. et al., J. Am. Chem. Soc., 89, 5358 (1958)).

The photocured film formed during the A stage polymerisation was transparent and either colourless or slightly coloured. When this photocured film was subsequently heated from ambient temperature to 300° C. at a rate of 5° C. per minute, or, heated to 140° C. at this rate, and held at the latter temperature for one hour, the polymer underwent a structural rearrangement and developed into an intensely coloured reddish transparent film which was not decomposed. The said rearranged polymer had a glass transition temperature (Tg) around 300° C. (1 Hz by Dynamic Mechanical Thermal Analysis—DMTA) and retained approximately 98% of its room temperature log modulus (log G') at 300° C. The rearranged polymer was further characterised by a very low Tanδ value, typically <0.10 (1 Hz by DMTA). No loss in performance was noted on repeatedly recycling the film between 25° and 300° C. in a Dynamic Mechanical Thermal Analyser. Thermal Gravimetric Analysis (TGA) indicated the rearranged polymer to lose <4% wt at 300° C.

EXAMPLE 2

When Example 1 was repeated using allyloxystyrene in place of propenyloxystyrene as the initial monomer, a rearranged material also resulted after the dual cure stages A and B. The rearrangement was conveniently followed by DMTA when a large drop in log G' from 7 to about 3-5 occurred at around 60° C. The modulus started to climb again at temperatures greater than 150° C. After scanning to 300° C. the polymer was red in colour and a rescan by DMTA showed retention of the initial log G' value of 7 PA.

Thermal treatment alone as observed by Dielectric Thermal Analysis (DETA) experiments showed that allyloxystyrene will not rearrange itself at temperatures less than about 250° C.

EXAMPLE 3

A mixture of 4-allyloxystyrene and 4-propenyloxystyrene was prepared and analysed by the GC-MS technique. The instrument used was a Hewlett-Packard 58-90 GC system with an electron impact mass selective detector. The column head pressure was 15 p.s.i. of Helium as carrier, column type was a 25m capillary type of 0.25mm with a BP10 coating. Injection was made at 300° C. from Analar (Trade Mark) grade chloromethane. Total ion current traces for the styryloxy mixture indicated three components to be present. Two components were isomeric and had molecular mass of 160 units. In order of ascending boiling points these two were identified as propenyloxystyrene and allyloxystyrene. The analysis also indicated the presence of a third compound referred to hereafter as K. The concentration of K in the gas chromatogram was dependent upon the temperature of sample injection. Integration of GC data at 300° C. injection temperature characterised the styryloxy mixture as 22% propenyloxystyrene, 63% allyloxystyrene and 15% K. Proton NMR run at room temperature in CDCl₃ as solvent and TMS as reference indicated the styryloxy mixture to contain propenyloxystyrene and allyloxystyrene only.

When a photocurable composition containing 75% of this styryloxymixture and 25% of the commercially available vinyl ether known as DVE-3 from the GAF Company and 15 µl/gm of photoinitiator GE 1014 from General Electric Co. was cured in stage A with 100 mW/cm² of UV light for 5-10 seconds and then subjected to a heating cycle (stage B) as described in Example 1, a red polymeric material resulted with good high temperature performance. Thermal Gravimetric Analysis of the composition indicated an approximately 8% weight loss at 300° C. as compared to a 30% weight loss at this temperature for a cured polymer from DVE-3 alone. Pin-to-glass tensile testing after aging in an oven set at 200° C. for 16 hours showed bond strengths in the order of 120 dN/cm² for the rearranged polymer. Bond strength for a polymer of DVE-3 alone could not be measured because it had disintegrated entirely when subjected to such treatment. The bond strengths of the thermally aged composition (stage B) were often higher than those of the purely photocured composition (stage A) at room temperature.

Dielectric Thermal Analysis (DETA) of the photocured composition mentioned above, in the temperature range of 25°-300° C. and at 1, 10 and 50 kHz, indicated on first scan two loss processes, one at 85° C. and the other at 210° C., which were nominally frequency independent. These corresponded to peaks in log $\epsilon'$ at 85° C. and 220° C. At the end of the thermal dielectric scan the initially colourless polymer was now deep red over its entire area of about 5 cm² indicating that a rearrangement had occurred. On re-running the DETA from 25°-300° C. on the previously scanned (i.e., rearranged) photocured composition, the first loss process disappeared and the high temperature loss process moved to 265° C. and was again largely frequency independent.

If the A stage is omitted and the aforementioned photocurable composition is simply heated in the DETA between 25°-300° C. under the same conditions as before, the sample retains the permittivity behaviour of a liquid until about 250° C. and does not behave in the same way as before. Eventually the sample thermally polymerises showing strongly frequency dependent DETA characteristics. The film appears yellowish at 300° C.

Dynamic Mechanical Thermal Analysis of the said mixture provided a means for imposing stage B on an already photocured composition whilst simultaneously probing its mechanical properties. At 1 Hz and scanning between 25° and 300° C. at a rate of 5° C./min a Tg was noted for styryloxy (unrearranged) polymer plasticised by the DVE-3 material at about 48° C. with Tan $\delta$=0.88. If DVE-3 were not present the Tg value would normally be around 70° C. and Tan $\delta \geq 1.0$. As the stage B treatment was imposed, changes in mechanical properties were noted above 150° C. and a new loss process occurred at around 220° C. The resultant cured composition was of a deep red colour after this treatment and stable to 300° C. On thermal rescan the aforementioned low temperature loss process (at 48° or 70° C., depending on the presence or absence of DVE-3) disappeared, only the high temperature loss process persisted at around 220° C. and the log G' value at temperatures of greater than 250° C. was around 6.5 PA, a figure close to its initial room temperature modulus after stage A only.

EXAMPLE 4

When propenyloxystyrene was formulated with allyloxystyrene or the vinyl ether DVE-3 together with cationic photoinitiator GE 1014 at 15 µl/gm, and subjected to photocure followed by thermal cure, the initially colourless transparent photocured compositions were transformed into red-brown undecomposed solids with temperature resistant properties as illustrated by DMTA and/or TGA. Increasing the propenyloxystyrene content in mixtures thereof with allyloxystyrene caused an increase in Tg as shown below. In this case TGA gave an average of 3% weight loss at 350° C.

| Propenyloxystyrene: allyloxystyrene | 25:75 | 50:50 | 75:25 | 100:0 |
|---|---|---|---|---|
| Tg (°C.) | 110 | 140 | 180 | 300 |
| Tan $\delta$ @ Tg | 0.5 | 0.41 | 0.1 | 0.1 |
| log G' at 300° C. (PA) | 6.0 | 5.6 | 6.75 | 6.8 |

Increasing the propenyloxystyrene content in mixtures with GAF divinylether DVE-3 showed reduction in high temperature weight loss as shown below.

| Propenyloxystyrene:DVE-3 | 0:100 | 25:75 | 50:50 | 72:25 | 100:1 |
|---|---|---|---|---|---|
| weight loss @ 300° C. % | 30 | 15 | 11 | 8 | 3 |

EXAMPLE 5

When resorcinolic type materials were derivatised with alkenyloxy type systems and mixed into cationically photocurable matrices which hitherto had no known high temperature resistant characteristics, rearrangements within the polymeric system resulting from stage A (photocure), stage B (thermal secondary cure), cationic photoinitiator residues and aromatic alkenyloxy systems, transformed the said matrices into polymers of orange/red colour which now had superior high temperature performance. Thus when the commercially available divinyl ether known as DVE-3 from GAF Co. was scanned in a Dynamic Mechanical Thermal Analyser, its initial log G' value of around 6.5 PA was retained steadily to around 140° C. However, within the next few degrees of higher temperature the polymer decomposed as indicated by a drastic loss in modulus (several orders of magnitude) and a rapid increase of Tan $\delta$, which is characteristic of decomposition. When DVE-3 was formulated with a 50% loading of 1,3-dipropenyloxy benzene (dipropenyl resorcinol) and photocured using 15 µl/gm GE 1014 as photocatalyst, the mechanical properties of the resulting film were transformed as a result of the heat treatment during thermal scan in the instrument. Initially the log G' value of the mixed composition was 7.25, higher than before, but this dropped to around 6 following an $\alpha$-process, typifying a polymeric transition. The value log G'=6 was retained to around 280° C. by which time the film had also changed colour to a reddish-like material. The Tg for this subsequent material was ≧300° C.

Similar behaviour was noted when diallyl resorcinol was used in place of dipropenyl resorcinol. When the allyl-like material was used, the attainment of high temperature resistant properties was slower and the resulting films were, on first thermal cycle (stage B or first DMTA scan), more yellowish than red. Mixtures of alkenyloxy resorcinols with thermally labile formaldehyde sources such as trioxane in photocured DVE-3 matrices also showed colouration and temperature resistance following stage B thermal treatment.

EXAMPLE 6

The divinylether of the structure shown below (Formula XIII) and previously claimed as a photocurable material in U.S. patent application Ser. No. 07/543,248 of Klemarczyk et al, mentioned above, can also be rearranged to give a polymer of orange/red colour with high temperature resistant properties.

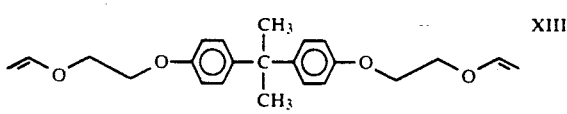

XIII

This material photocured when formulated with the cationic photoinitiator GE 1014 and subjected to UV light to give a clear (transparent) yellow polymer film. During photolysis some ortho-alkenyl phenolic like material was formed as evidenced from Infrared Spectroscopic Analysis (cf. Example 1). In stage B, i.e. heating the said cationically photocured composition, rearrangement occurred to give a deep orange polymer now with much more intense —OH absorbance in the infrared spectrum at approximately 3400 cm$^{-1}$. The said polymer showed low weight loss at 300° C. (8%). On first scan in the Dynamic Mechanical Thermal Analyser the material which had an initial Tg of 55° C. (1 Hz) indicated secondary cure by an upturn in modulus at temperatures greater than 100° C. The sample was repeatedly scanned to 300° C. with the 2nd to the 9th scans indicating Tg moving to higher temperatures (94, 108, 134, 135, 136, 147, 165 and 170) and an average log G' value of 6.5 PA at 300° C. The said divinyl ether when formulated with styryloxy monomers or other vinyl ethers and subjected to the dual curing process as described above in the presence of photoinitiator residues, gave red/orange materials with good thermal resistance properties as illustrated by DMTA and/or TGA and detailed below:

| Bisphenol A based vinyl ether: DVE-3 monomer | 0:100 | 25:75 | 50:50 | 75:25 | 100:0 |
|---|---|---|---|---|---|
| weight loss @ 300° C. (%) | 30 | 18 | 14 | 9 | 8 |

EXAMPLE 7

(a) Preparation of 4-(2'-hydroxyethoxy) benzaldehyde

A 5-liter glass reactor equipped with a reflux condenser, mechanical stirrer and powder inlet port, was charged with 366 g of 4-hydroxybenzaldehyde, 528 g of ethylene carbonate and 1.5L of methylisobutyl ketone (MIBK). The mixture was stirred. On solution of aldehyde and carbonate 414 g of anhydrous potassium carbonate was slowly added. The stirred mixture was refluxed for four hours after which time t.l.c. analysis indicated complete consumption of the phenolic starting compound. The reaction mixture was cooled and 1.5L of 3M sodium hydroxide solution added. The organic layer was separated, washed with H$_2$O and dried over anhydrous sodium sulfate. The dried solution was filtered and the solvent removed under reduced pressure to give 496 g of an orange coloured oil. Gel permeation chromatographic analysis (G.P.C.; 10 styrogel columns, 10$^3$, 500 and 100 Angstrom, CH$_2$Cl$_2$ eluent; R.I. detector) showed the oil to consist mainly of 2 components with elution volumes of 24.9 mls (Approx. 80%) and 23.7 mls (Approx. 20%) along with minor quantities of higher molecular weight products. Vacuum distillation of the crude product gave 330 g. (66%) of 4-(2'-hydroxyethoxy) benzaldehyde (formula Ia) (170°-190° C. at 0.4 mbar) which was shown by G.P.C. to also contain approx. 5% of a higher molecular weight product. The infra-red (NaCl disc) spectrum of the distilled product showed peaks at 3,580 cm$^{-1}$ (—OH group); 1675, 2920 cm$^{-1}$ (AR—CHO group); 1590 cm$^{-1}$ (AR-H group) and 1255cm$^{-1}$ (AR—O—C group) which confirms the structural assignment.

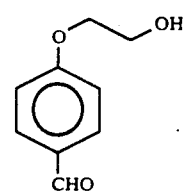

Ia (b) Preparation of 4-(2'- hydroxyethoxy)styrene

A 5 liter glass reactor, equipped with a reflux condenser, N$_2$ purge, powder inlet port, dropping funnel and mechanical stirrer was charged with dry tetrahydrofuran (1.5 L) and sodium amide (91 g of 90%, 2.1 m). To the stirred suspension was added methyltriphenylphosphonium bromide (750 g, 2.lm), and the mixture stirred at room temperature for 3 hours. A solution of 290.5 g of 4-(2'-hydroxyethoxy) benzaldehyde (prepared as described in Example 7 (a)) in 200 mls of dry tetrahydrofuran was added dropwise over 1.5 hours. The stirred mixture was refluxed for 3 hours after which time t.l.c. analysis indicated complete consumption of the starting aldehyde. The mixture was cooled and H20 (4L) added. The mixture was extracted with dichloromethane (4×500 mls) and the combined extracts dried over anhydrous Na$_2$SO$_4$. The desiccant was removed by filtration and the solvent distilled under reduced pressure to yield 850 g of a viscous semi-solid residue. The residue was extracted with petroleum spirit b.p. 40°-60° C.· (5×500 mls) followed by an 80/20 blend of petroleum spirit and diethyl ether, until GPC and t.l.c. analysis indicated the residue to comprise only triphenylphosphine oxide. The extracts were combined and the solvent reduced by vacuum distillation to approximately one liter. The triphenylphosphine oxide, which had precipitated, was removed by filtration and the remainder of the solvent in the filtrate was removed under reduced pressure to yield an oil (413 g). The oil was distilled under vacuum to yield 4-(2'-hydroxyethoxy) styrene (114.4 g, 40%, 140°-160° C. at 0.8 mbar) as a colourless oil which solidified on cooling. G.P.C. analysis indicated only one component (i.e. 100% purity). The structure of the product, formula IIa, was confirmed by spectroscopic analysis.

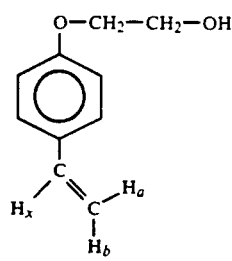

IIa

'HNMR(CDCl$_3$,60MHz) τ2.90,m, 4H, AR—H, τ3.35,m,1H, AR—CH=C; τ4.4, q, 1H, AR—C= C—H$_a$ (Jax=18Hz, Jab=2Hz); τ4.86, q, 1H, AR—C= C—H$_b$ (Jbx=11 Hz, Jba=2Hz); τ5.99, m, 4H, —OCH$_2$CH$_2$—O—; τ7.3, 1H broad S, —OH, I.R. (NaCl); 3540 cm$^{-1}$ —OH group, 1620 cm$^{-1}$ AR—CH=CH$_2$; 1590 cm$^{-1}$, Ar—H; 1245 cm$^{-1}$ AR—O—C—.

(c) Preparation of α, ω-bistosyloxypoly(oxybutylene)

A solution of freshly purified p-toluenesulfonyl chloride (83.9 g, 0.44 moles) in toluene (200 mls.) was added dropwise over one hour to a stirred solution of dry poly(1,4-oxybutylene) glycol (130 g: molecular weight average=650, Polymeg 650 supplied by QO Chemicals, Inc.; 0.2 moles) and dry freshly distilled triethylamine (80.8 g, 0.8 moles) in toluene (150 mls) under a dry N$_2$ atmosphere. After 64 hours, the reaction mixture was filtered and the filtered solid washed with toluene. The filtrate was allowed to stand for a further 24 hours and refiltered. The solvent was removed from the filtrate on a rotary evaporator to yield a straw coloured oil (155.86 g, 81%) which was shown by I.R. spectroscopy and HP liquid chromatography to comprise mainly the required bis-tosylate ester of the structure shown in formula IIIa:

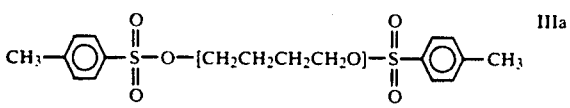

IIIa

I.R. NaCl (film): 1595 cm$^{-1}$, C—C stretching vibration, aromatic group

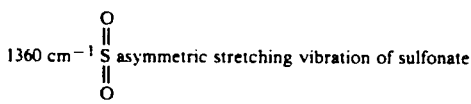

1360 cm$^{-1}$ S asymmetric stretching vibration of sulfonate

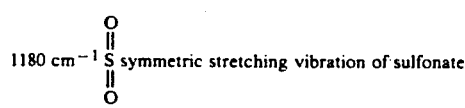

1180 cm$^{-1}$ S symmetric stretching vibration of sulfonate (d) Preparation of Styryloxy Capped Poly (1, 4-oxybutylene)glycol Sodium hydride (2.76 g, 0.115 moles) was added to a stirred solution of 4-(2'-hydroxyethoxy)-styrene (18.86 g, 0.115 moles) (prepared as described in Example 7(b) in dry tetrahydrofuran (THF) (100 mls.). After evolution of hydrogen gas had ceased, a solution of the α,ω-bistosyloxypoly(oxybutylene) product of Example 7(c) (55.14 g, 0.0575 moles) in THF (300 mls) and tetrabutylammonium bromide (9 g) were added sequentially to the reaction mixture. After stirring for 17 hr. at room temperature, the reaction mixture was filtered and the solvent removed from the filtrate under reduced pressure. The residue was dissolved in dichloromethane (200 mls), washed with water (50 mls) and dried (Na$_2$SO$_4$). The solvent was removed under reduced pressure and the residue dissolved in THF (150 mls). Addition of Petroleum spirit b.p. 40°-60° C. (450 mls) to this solution afforded the required crude product as an oily precipitate (38.1 g, 80%), [which crystallized to a low melting solid on standing]. The structure of the product was confirmed by 'H NMR and IR spectrocopy to be:

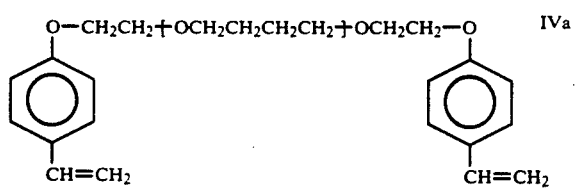

IVa

60 MH$_z$ 'H NMR (CDCl$_3$):
2.6-3.2, m, 8H, aromatic protons
3.3-3.7, m, 2H, AR—CH=C
4.45, q, 2H, Ar—C=C—H$_a$ (Jax=18Hz, Jab=2 Hz)
4.95, q, 2H, Ar—C=C—Hb (Jbx=11 Hz, Jba=2Hz)
5.8-6.9, m, 44H, C—CH$_2$—O
8.0-8.7 m, 36H, C—CH$_2$—C I. R. Spectrum (NaCl film), 1620cm$^{-1}$, C=C stretching vibration of aromatic vinyl group.

The styryloxy capped polyether thus formed was formulated in a photocationically curable composition with the styryloxy monomer mixture of Example 3 in various proportions, together with photoinitiator GE 1014 at 15 μl/gm. After the 2-state curing process as described above, the thermal resistance properties as determined by DMTA Analysis (1 Hz, 5° C./min) were as set forth below.

| % Styryloxy-capped Polyether | % Styryloxy Monomer | Result |
| --- | --- | --- |
| 100 | 0 | Material decomposes at 100° C. |
| 75 | 25 | Material decomposes at 180° C. |
| 50 | 50 | No decomposition. Secondary cure is indicated by upturn in modulus at ≈150° C. The sample can be cycled to 300° C. |
| 25 | 75 | No decomposition. Secondary cure is indicated by upturn in modulus at ≈150° C. The sample can be cycled to 300° C. |

Obviously, other modifications and variations to the present invention are possible and may be apparent to those skilled in the art in light of the above teachings. Thus, it is to be understood that such modifications and variations to the specific embodiments set forth above are to be construed as being within the full intended scope of the present invention as defined by the appended claims.

We claim:

1. A method of forming high-temperature resistant polymers said method comprising the steps of
  (a) curing a polymerisable composition (A) containing at least one compound of the formula VI:

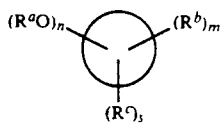

VI wherein ○ is a single or multiple aromatic ring structure, each $R^a$, which may be the same or different, is H or alkenyl, which may optionally be substituted;
each $R^b$, which may be the same or different, is alkenyl, which may optionally be substituted,
each $R^c$, which may be the same or different, is a polymerisable or non-polymerisable group which does not interfere with the polymerisation of the composition;
$n = 1-3$;
$m = 0-3$;
$1 \leq (m+n) \leq 6$;
$0 \leq s \leq r-(m+n)$ where r is the total number of substitutable positions on the ring structure:
provided that
(I) when the polymerisable composition A comprises a compound of formula VI and a matrix monomer, said matrix monomer being curable or polymerisable under the curing conditions of step (a), then (i) at least two of the moieties $R^a$ and/or $R^b$ must have unsaturation at the alpha or beta carbon atom or (ii) at least one of the moieties $R^a$, $R^b$ or $R^c$ is polymerisable or curable under the curing conditions of step (a) and at least one other of $R^a$ or $R^b$ has unsaturation at the alpha or beta carbon atoms; and
(II) when the polymerisable composition A comprises a mixture of compounds of formula VI then (i) at least one of said compounds has at least one moiety $R^a$, $R^b$ or $R^c$ which is polymerisable or curable under the curing conditions of step (a) and at least one moiety $R^a$ or $R^b$ which has unsaturation at the alpha or beta carbon atom and (ii) the other compound has the same requirements as I (i) or II (i) above; and
(III) when the polymerisable composition A contains as the only polymerisable component, a compound of formula VI, then said compound has at least one moiety $R^a$, $R^b$ and/or $R^c$ which is polymerisable or curable under the curing conditions of step (a) and at least one moiety $R^a$ and $R^b$ which has unsaturation at the alpha or beta carbon atom; and
provided that the curing conditions for step (a) are not such as would cause the substantial polymerisation of the moieties $R^a$ and $R^b$ having alpha or beta unsaturation, and
provided that when $m=0$ or when the required number of moieties $R^a$ and $R^b$ having alpha or beta unsaturation is greater than the number of $R^b$ moieties having said alpha or beta unsaturation, then at least one position ortho to each $-OR^a$ ($R^a$ not equal to H) or the para position thereto, or in the case of a fused ring structure at least one substitutable position on the fused ring, is unsubstituted; the alpha carbon atom being that carbon atom nearest the oxygen atom (in the case of $R^a$) or the ring (in the case of $R^b$);
and (b) subsequently heating the cured composition in the presence of acid to form a high temperature resistant crosslinked resin.

2. A method according to claim 1 wherein the polymerisable composition contains one or more compounds of the formula VIII:

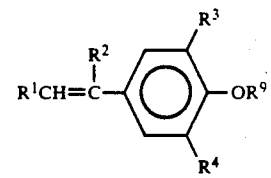

wherein $R^1$ and $R^2$ are H, or one of $R^1$ and $R^2$ is H and the other is methyl; $R^3$ and $R^4$ are H, lower alkyl or alkoxy if $R^2$ is not methyl, provided that at least one of $R^3$ or $R^4$ is H; and $R^9$ is selected from the group consisting of

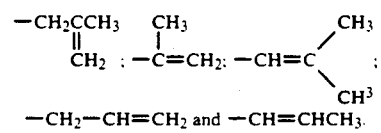

3. A method according to claim 1 wherein the ring structure ○ is selected from phenyl, fused aromatic ring structure and

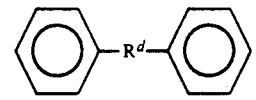

wherein $R^d$ represents a covalent bond, a substituted or unsubstituted alkylene group,

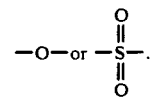

4. A method according to claim 1 wherein each $R^1$ or $R^b$ is independently selected from H (in the case of $R^a$), $C_2$-$C_{10}$ straight or branched chain alkenyl groups or $C_2$-$C_{10}$ straight or branched chain alkenyl groups interrupted by an oxygen or sulfur atom or substituted with a halo group.

5. A method according to claim 1 wherein the polymerisable composition comprises a compound of formula VI and a matrix monomer.

6. A method according to claim 5 wherein the matrix monomer is co-polymerizable with the compound of formula VI curing under the condition of step (a).

7. A method according to claim 5 wherein the matrix monomer is concurrently polymerizable with the compound of formula VI under the curing conditions of step (a).

8. A method according to claim 5 wherein the compound of formula VI is non-polymerizable under the curing condition of step (a).

9. A method according to claim 1 wherein the polymerisable composition comprises a mixture of compounds of formula VI.

10. A method according to claim 1 wherein the polymerisable composition contains as the only polymerisable component a compound of formula VI.

11. A method according to claim 1 wherein m=0.

12. A method according to claim 11 wherein s≧1 and $R^c$ is a polymerisable group.

13. A method according to claim 1 wherein $R^a$ or $R^b$ is selected from the group consisting of

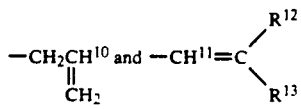

wherein $R^{10}$, $R^{11}$, $R^{12}$ and $R^{13}$ which may be the same or different, are H or $C_1$-$C_5$ alkyl and at least one of $R^{11}$, $R^{12}$ and $R^{13}$ is other than H.

14. A method according to claim 1 wherein $R^c$ is a polymerisable group selected from the group consisting of

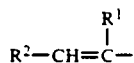

wherein $R^1$ and $R^2$ are H, or one of $R^1$ and $R^2$ is H and the other is methyl; a vinyl ether group; an acrylic group; or an epoxy group.

15. A method according to claim 1 wherein the curing process of step (a) is selected from radical, cationic, heat, redox, anionic, atmospheric, e-beam, X-ray, gamma-ray curing modalities.

16. A method according to claim 15 wherein the first stage of the curing process is by photocuring and the composition contains a cationic photoinitiator.

17. A method according to claim 16 wherein the polymerisable composition comprises (a) a compound of the formula VI,
(b) a divinyl ether of a polyalkylene oxide, and
(c) a photoinitiator.

18. A method according to claim 16 wherein the compound of formula VI is produced in situ in the composition during photocuring by cleavage beyond a phenolic oxygen or by rearrangement.

19. A method according to claim 16 wherein the second step of the curing process is carried out in the presence of acid generated by the photoinitiator.

20. A method according to claim 1 wherein the polymerisable composition contains a compound of the formula

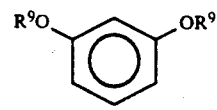

wherein $R^9$ is selected from the group consisting of

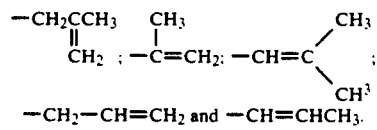

21. A method according to claim 1 wherein the acid is generated or released thermally or photochemically.

22. A method according to claim 1 wherein the second step of the curing process is carried out at a temperature of at least 125° C.

23. A method according to claim 1 wherein the cured composition of step a undergoes a rearrangement under the curing condition of step (b) to form a higher temperature resistant cured composition.

* * * * *